(12) United States Patent
Ridgway et al.

(10) Patent No.: US 7,264,274 B2
(45) Date of Patent: Sep. 4, 2007

(54) TUNEABLE ENERGY ABSORBING MOUNTING STRUCTURE FOR STEERING COLUMN

(75) Inventors: Jason R. Ridgway, Bay City, MI (US); Sam L. Scrivener, Durand, MI (US)

(73) Assignee: Delphi Technologies, Inc., Troy, MI (US)

( * ) Notice: Subject to any disclaimer, the term of this patent is extended or adjusted under 35 U.S.C. 154(b) by 254 days.

(21) Appl. No.: 11/158,406

(22) Filed: Jun. 22, 2005

(65) Prior Publication Data

US 2006/0290128 A1  Dec. 28, 2006

(51) Int. Cl.
    *B62D 1/19* (2006.01)
(52) U.S. Cl. .................................... 280/777; 188/376
(58) Field of Classification Search ................ 280/777, 280/779; 74/492, 493; 188/376
    See application file for complete search history.

(56) References Cited

U.S. PATENT DOCUMENTS

| 4,989,898 A | * | 2/1991 | Yamaguchi et al. | ......... | 280/777 |
| 5,738,377 A | * | 4/1998 | Sugiki et al. | ................ | 280/777 |
| 6,575,497 B1 | * | 6/2003 | McCarthy et al. | ........... | 280/777 |
| 6,592,148 B2 | | 7/2003 | Byers et al. | ................ | 280/777 |
| 6,726,248 B2 | * | 4/2004 | Satou et al. | ................ | 280/777 |
| 6,802,536 B2 | | 10/2004 | Li et al. | ...................... | 280/777 |
| 6,814,373 B2 | | 11/2004 | Munro et al. | ............... | 280/777 |
| 6,877,775 B2 | | 4/2005 | Manwaring et al. | ........ | 280/777 |

FOREIGN PATENT DOCUMENTS

GB        2247652 A     *  3/1992

\* cited by examiner

*Primary Examiner*—Robert A. Coker
(74) *Attorney, Agent, or Firm*—Michael D. Smith (57) ABSTRACT

A steering column assembly (10) of the collapsible type includes a mounting plate (30) for rigid attachment to a vehicle body structure. The mounting plate (30) supports the steering column (12) during normal operation through interconnecting release capsules (24) which allow the steering column (12) to collapse, away from the rigidly attached mounting plate (30), during a frontal collision. An energy absorbing tear strip (44) in formed integrally in the mounting plate (30) and is connected via tab (43) to a fixed connection (42) which adjoins a portion of the column bracket (18). The column bracket (18) moves together with the steering column (12) during a collapse situation. The tear strip (44) simultaneously bends and tears in a peeling fashion as the steering column (12) collapses to provide energy absorption for the assembly (10). The transverse cross-sectional area of the tear strip (44) can be varied along its length to tune the energy absorption force exhibited by the tear strip (44) throughout the collapsing stroke.

19 Claims, 6 Drawing Sheets

TUNEABLE ENERGY ABSORBING MOUNTING STRUCTURE FOR STEERING COLUMN

FIELD OF THE INVENTION

The invention relates to a collapsible steering column assembly for a motor vehicle, and more particularly toward such an assembly including a rigid mounting plate which has incorporated therein an energy absorbing tear strip to gradually arrest collapse of a steering column during a frontal collision.

BACKGROUND OF THE INVENTION

Steering column assemblies for vehicles are available that collapse during a frontal collision. Energy absorption systems are used with the collapsible columns. These energy absorption systems cooperate with air bags to minimize the force exerted on a vehicle driver during a collision.

Current steering column energy absorption systems can take many forms. One such common form employs a column bracket that is secured through a releasable connection to a vehicle structure such as under a dash board. Energy absorption straps or coils become engaged as the releasable connection yields to the overwhelming force of a frontal collision. Energy absorption straps or coils, employed in many energy absorption systems, are expensive. These energy absorption straps or coils can be located in the releasable mounting connection of the column bracket to the vehicle structure, or between the steering column and an intermediate bracket. Energy absorption straps and coils require multiple threaded fasteners, and their assembly can be labor intensive, physically taxing and time consuming.

In some vehicle applications, special mounting requirements are imposed upon the steering column assembly to improve column stiffness, or to control the collapsing direction of the column in the event of a collision. Typically, a rigid mounting plate is required to accomplish either or both of these functions, or is incorporated into a steering column assembly for other reasons. A mounting plate, when required, typically provides at least three to four mounting points and may be fabricated from a durable gauge formed metal or plastic material. Thus, a mounting plate adds both weight and cost to the steering column assembly. This extra weight and cost is in addition to the cost, weight and complexity of energy absorption straps or coils that are required for collision management purposes.

Therefore, it would be desirable to provide an energy absorption system for steering column assemblies which require a mounting plate that is less expensive to manufacture, lighter in weight, and more easily assembled to a motor vehicle.

SUMMARY OF THE INVENTION AND ADVANTAGES

The subject invention overcomes the shortcomings and disadvantages of the prior art by providing an energy absorbing column mounting assembly for a collapsible steering column. The mounting assembly comprises a mounting plate for rigid attachment to a vehicle body structure. A column bracket, adjacent the mounting plate, is provided for supporting a vehicular steering column. At least one releasable connection interconnects the column bracket to the mounting plate for automatically disconnecting the column bracket in response to a predetermined disconnection force during a controlled collapse of the steering column. In addition to the releasable connection, there is however provided at least one fixed connection joining the column bracket to the mounting plate which maintains its connection after the releasable connection is yielded to the disconnection force. An energy absorbing tear strip is formed integrally into the body of the mounting plate, adjacent the fixed connection, for deforming a portion of the mounting plate under the influence of the overwhelming force. The energy absorbing tear strip, pulled along through the fixed connection, gradually arrests relative movement between the column bracket and the mounting plate during a controlled collapse of the steering column.

Thus, in applications where a mounting plate is required, such as for the purpose of improving column stiffness or influencing the travel path of the column bracket during collapse of the steering column, the expensive and assembly-intensive energy absorption strips or coils of the prior art are obviated by the integrated tear strip which is formed as a frangible portion of the mounting plate. Accordingly, the energy absorption device is incorporated directly into the mounting plate for essentially no additional cost with the added benefits of reduced weight and avoidance of complex assembly operations.

According to a second aspect of the invention, a collapsible steering column assembly for a motor vehicle is provided. The assembly comprises a mounting plate for rigid attachment to a vehicle body structure. A column bracket is disposed below the mounting plate. A vehicular steering column is carried in the column bracket. At least one releasable connection, e.g., a release capsule, interconnects the column bracket to the mounting plate for automatically disconnecting the column bracket in response to a predetermined disconnection force during a controlled collapse of the steering column. At least one fixed connection joins the column bracket to the mounting plate for maintaining a connection after the releasable connection has yielded to the disconnection force. An energy absorbing tear strip is formed integrally in the mounting plate, adjacent the fixed connection, for deforming as a frangible portion of the mounting plate under the influence of an overwhelming force applied thereto through the fixed connection. The energy absorbing tear strip gradually arrests movement of the column bracket during a controlled collapse of the steering column.

According to yet another aspect of the invention, a method of absorbing energy from a collapsing steering column under the influence of an overwhelming force is provided. The method comprises the steps of: attaching a mounting plate to a vehicle body structure, supporting a steering column from the mounting plate through a releasable connection, affixing a frangible portion of the upper plate to the steering column, subjecting the steering column to an overwhelming compressive force, automatically disconnecting the releasable connection to allow collapsing movement of the steering column relative to the mounting plate, and simultaneously tearing and bending the frangible portion of the mounting plate and thereby transferring energy from the overwhelming force into the mounting plate to gradually arrest collapsing movement of the steering column.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the figures, wherein like numerals indicate like or corresponding parts throughout the several views, a collapsible steering column assembly for a motor vehicle is generally shown at 10. Column assembly 10 may include a steering column, generally indicated at 12, which may be composed of a tubular upper jacket 14 and a lower shaft 16 carried inside the upper jacket 14. The steering column assembly 10 may take any of the known forms and configurations, but is of the collapsible variety in which, during a collision, the momentum of a driver's body applies an overwhelming force through the steering wheel, and the collapsing movement of the steering column 12 is designed to gradually arrest movement to minimize injury to the driver.

There is a great need to tune, or adjust, the energy absorbing mechanism in the steering column assembly 10 as a means to help manage the dissipation of the driver's impact energy during a frontal collision. While prior art designs have consisted of deformable structures or mechanisms that provide a resistive force which opposes the collapse direction of the column assembly, these prior energy absorbing mechanisms have been relatively expensive and cumbersome, and occupy space in an otherwise tight area. Furthermore, energy absorbing mechanisms in the prior art which are of the type integrated into the column structure have traditionally lacked the ability to be "tuned" and result in various and sometimes unpredictable energy absorbing reaction forces generated over the collapsed distance. The subject invention, however, provides the ability to tune the energy absorbing device to an optimum level which is important since the collapse force required to obtain the optimum energy absorbing characteristics is influenced by various instrument panel components, vehicle dynamics, and other structural features of the automobile.

The upper jacket 14 of the column assembly 10 is supported within a column bracket, generally indicated at 18. The column bracket 18 may either be fixed rigidly to the upper jacket 14, such as by welding, or carried in an articulating mechanism, such as a rake, tilt and/or telescoping adjustment mechanism 20. Through an adjustment mechanism 20, the orientation of the steering column 12 can be changed relative to the column bracket 18 to accommodate driver preferences and comfort.

Figure 1:
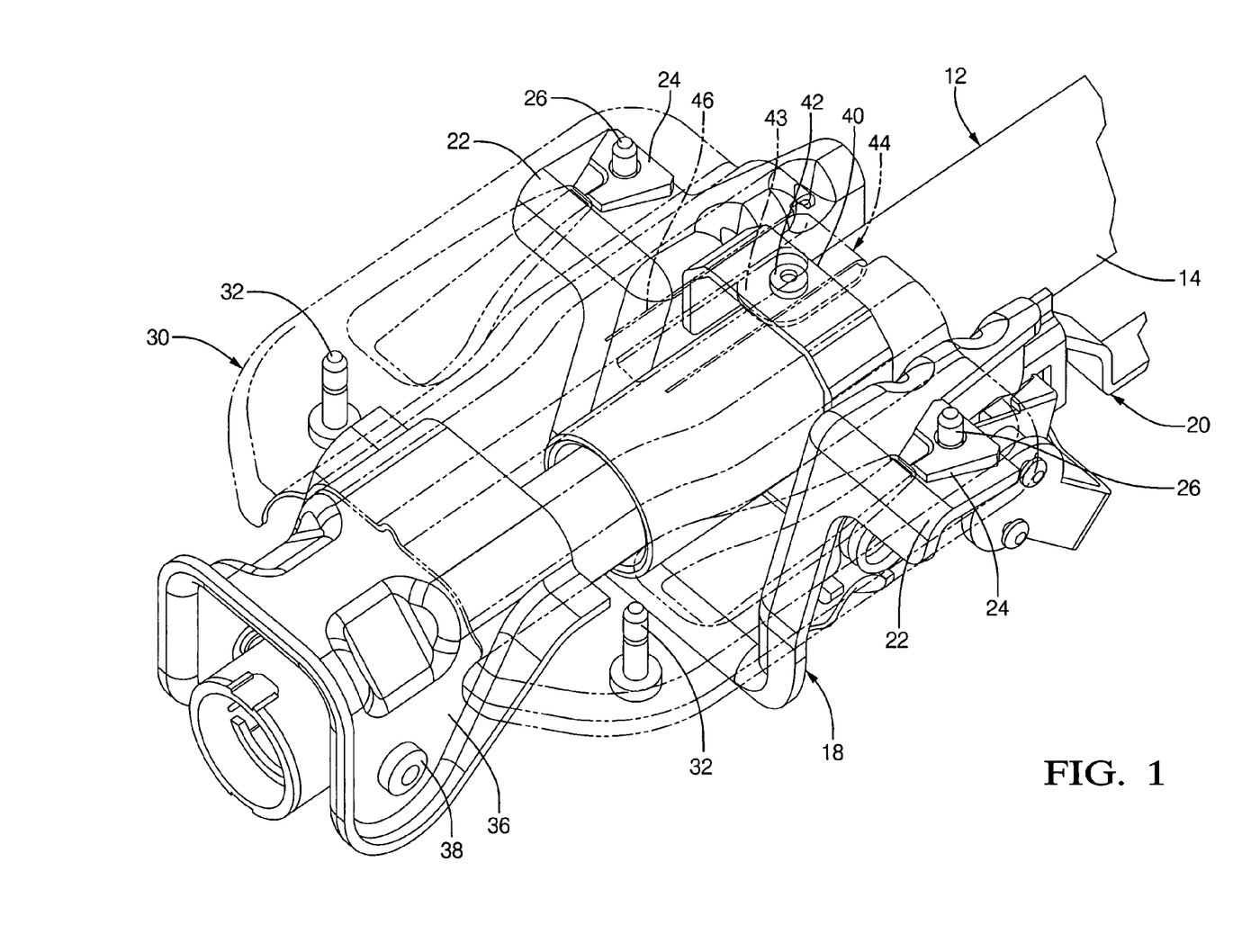
FIG. 1 is a perspective view of a collapsible steering column assembly according to the subject invention showing a mounting plate in phantom.
Figure 2:
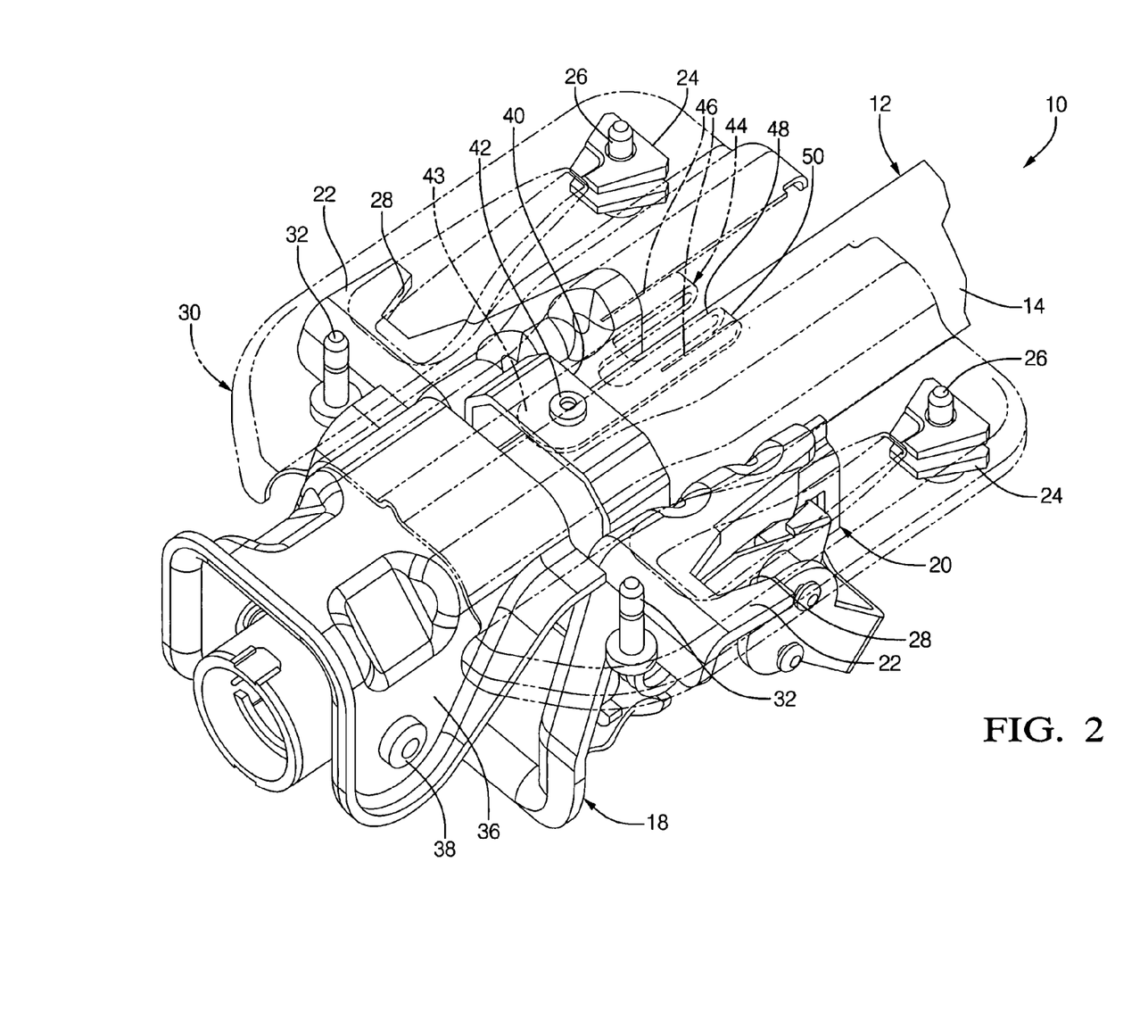
FIG. 2 is a perspective view as in FIG. 1 but showing the steering column in a collapsed condition with the energy absorbing tear strip pealed and curled under the mounting plate.

Accordingly, the column bracket 18 can take many forms. In the embodiment illustrated in FIGS. 1 and 2, the column bracket 18 has a pair of generally horizontal wings 22 extending on opposite sides of the steering column 12. The wings 22 establish mounting surfaces for a releasable connection, in the form of release capsules 24. In this example, the release capsules 24 are permanently attached to a vehicle body understructure, such as the dash board, via hanger bolts 26. In known fashion, the release capsules 24 engage the edges of a generally v-shaped slot 28 in each of the wings 22. The v-slots 28 open forwardly to provide clearance for the hanger bolts 26 during both normal operation when the release capsules 24 are joined to the column bracket 18, and during emergency release conditions when the column bracket 18 disengages from the release capsules 24. In FIG. 2, the column bracket 18 is shown in its collapsed condition and disengaged from the release capsules 24. A predetermined disconnection force, which is much lower than the foreseeable forces likely to arise in a collision situation, are required to disengage the release capsules 24.

Figure 3:
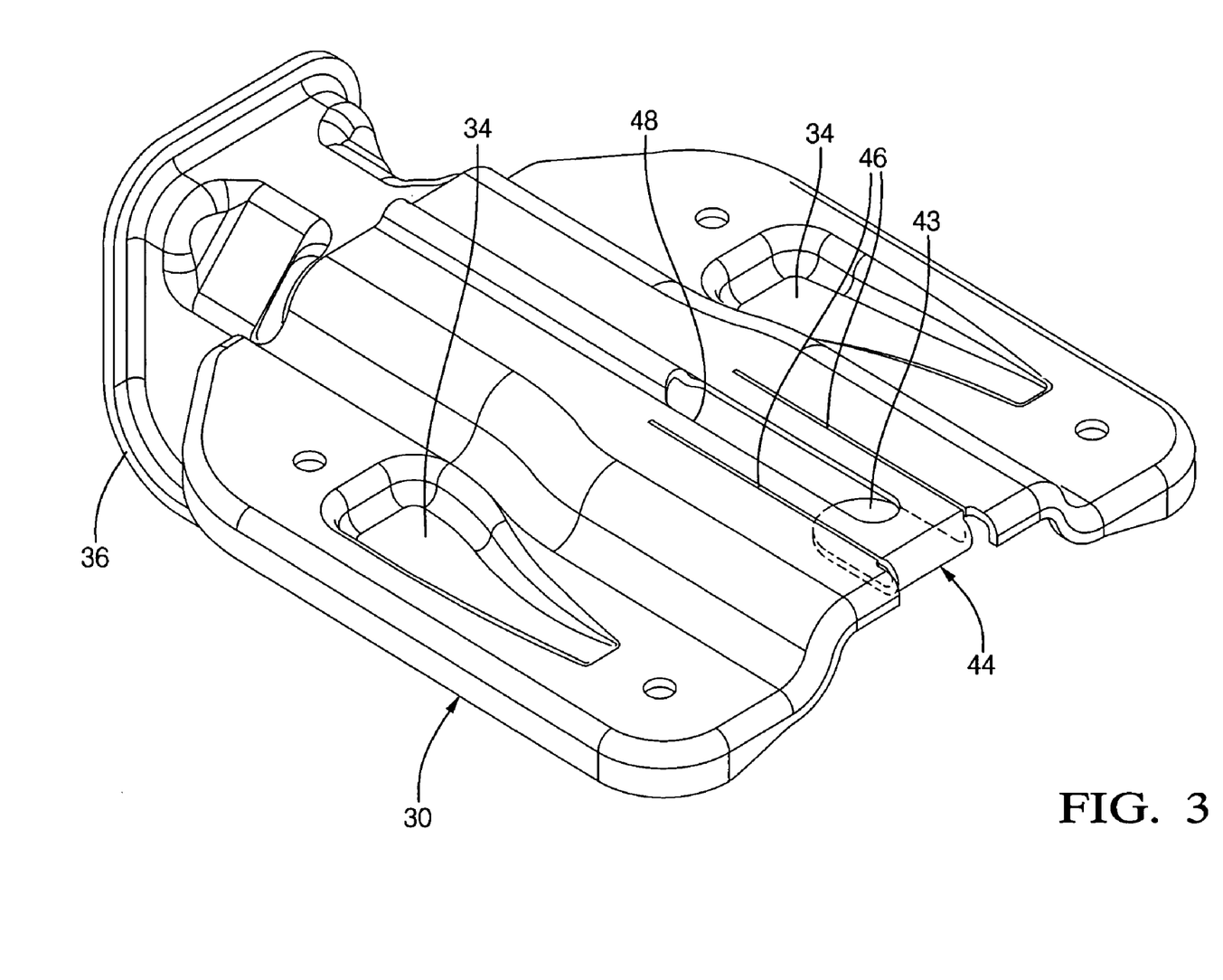
FIG. 3 is a perspective view of the mounting plate of the subject invention.
Figure 4:
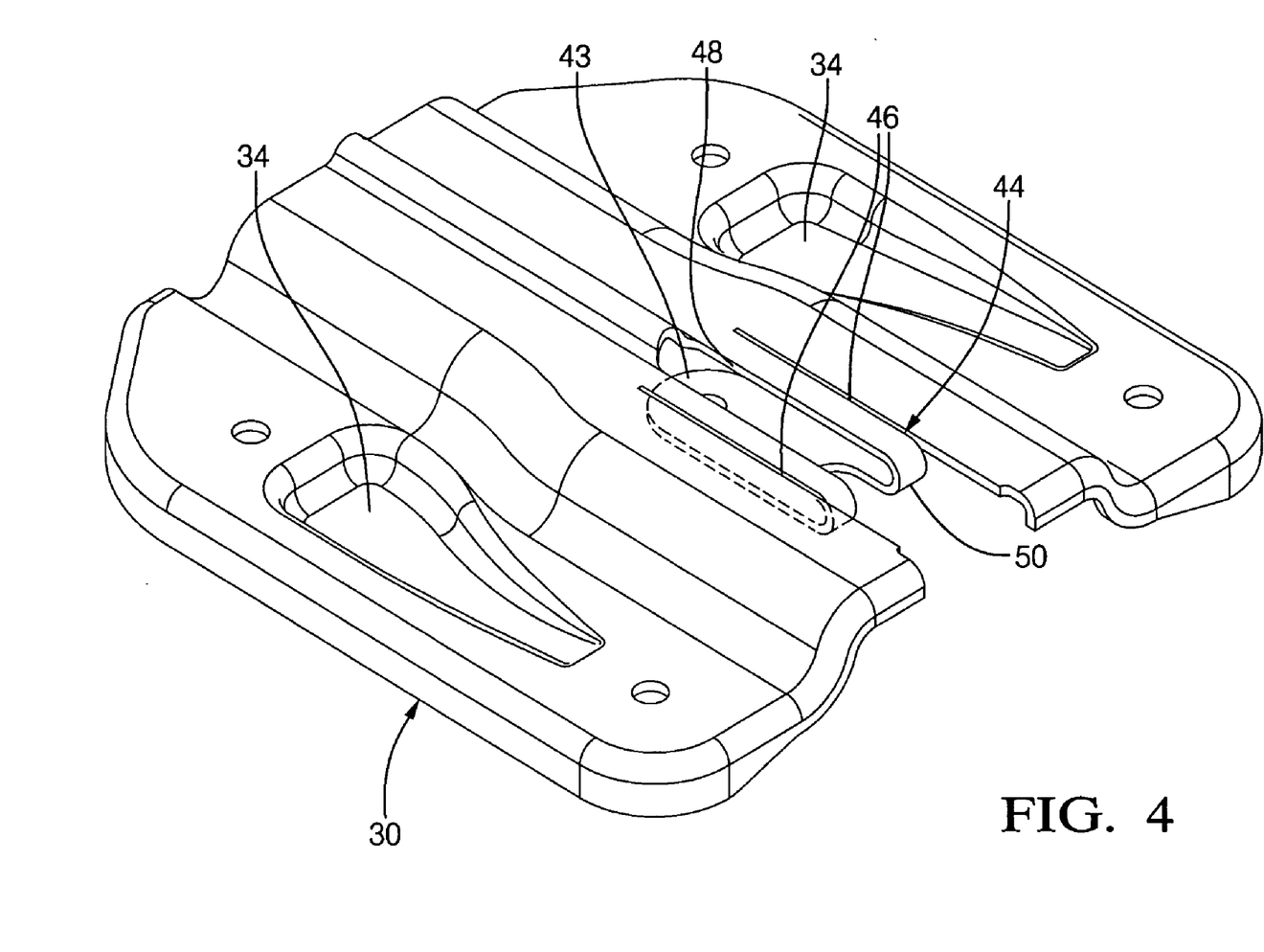
FIG. 4 is a view as in FIG. 3 but showing the energy absorbing tear strip torn and bent as would occur during collapse of the steering column.

A mounting plate, generally indicated at 30 in FIGS. 3 and 4, is interposed between the release capsules 24 and the vehicle body structure. Preferably, the mounting plate 30 is formed of a durable gauge sheet metal or structurally dependable plastic material. The mounting plate 30 is thus rigidly attached to the vehicle body structure through the hanger bolts 26. Additional mounting fasteners 32 can be located at spaced intervals to further improve the rigidity of the steering column assembly 10 through additional points of attachment to the vehicle body structure. Thus, the mounting plate 30 is effective to enhance the stiffness of the column assembly 10 through its multiple points of connection to the vehicle body structure. In some instances, a mounting plate 30 will be used for this purpose alone. In other instances, the mounting plate 30 may be required to influence the travel path of the column bracket 18 during collapse of the steering column 12. For example, the mounting plate 30 may include guides 34 in the shape of wedge-like depressions which function to contact the wings 22 during forward collapsing travel and alter the path of the column bracket 18 in a slightly downward direction. These guides 34 are merely exemplary, and the mounting plate 30 may be used for reasons other than stiffness and influencing the column bracket 18 travel path.

The extreme forward end of the mounting plate 30 includes an integrally joined pivot attachment bracket 36 which carries a pivot pin 38 and establishes a center of arcuate movement for a raking adjust feature as established by the adjustment mechanism 20. The pivot attachment bracket 36 is exemplary only, and other mounting plate styles may omit such a feature.

A bridge 40 is fixed within the column bracket 18 and spans generally from wing 22 to wing 22 over the steering column 12. The bridge 40 forms a point of fixation for a fixed connection 42 which adjoins the column bracket 18 to a tab-like extension 43 in the mounting plate 30 The fixed connection 42 is maintained even after the release capsules 24 have yielded to the disconnection force. An energy absorbing tear strip, generally indicated at 44, is formed integrally in the body of the mounting plate 30, leading from the tab 43. The tear strip 44 is designed so as to deform as a frangible portion of the mounting plate 30 under the influence of an overwhelming force applied thereto through the fixed connection 42. This, in turn, functions to gradually arrest relative movement between the column bracket 18 and the mounting plate 30 during collapse of the steering column 12. The tear strip 44 can be formed in any number of ways, but preferably includes a pair of linearly propagating stress concentrators formed along the upper surface of the mounting plate 30 extending from flanking sides of the tab 43.

Figure 5:
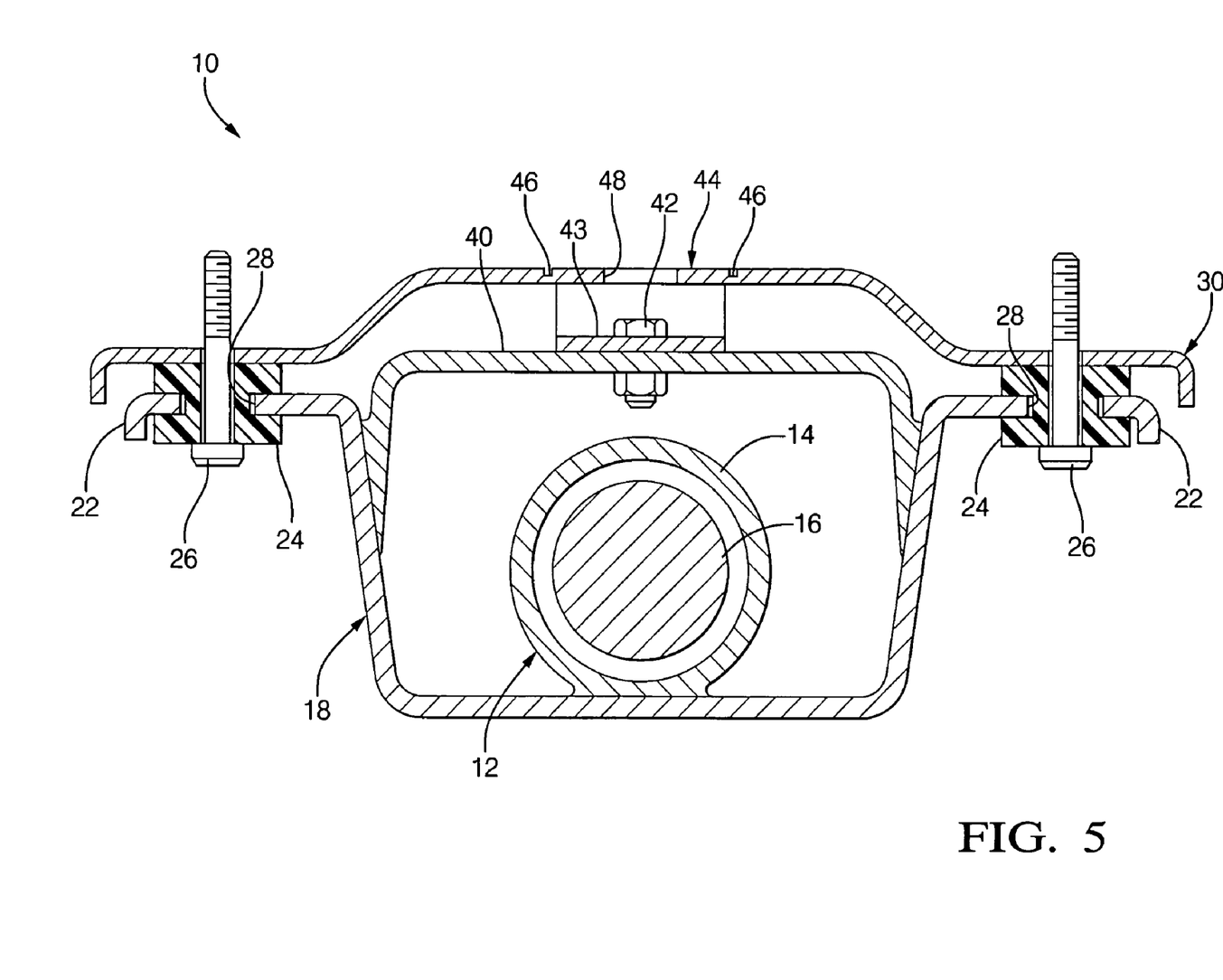
FIG. 5 is a simplified cross-sectional view taking generally along lines 5-5 in FIG. 1.

As perhaps best shown in FIG. 5, each linearly propagating stress concentrator may comprise a generally continuous score line 46 of reduced cross-sectional thickness in the mounting plate 30. These score lines 46 allow the tear strip 44 to simultaneously bend and tear out of the mounting plate 30 as the fixed connection 42 pulls on the tab 43 of the tear strip 44 during column collapse. As the tear strip 44 is pulled along by the fixed connection, a bend forms across the tear points in each of the score lines 46, thus creating a living hinge 50 which propagates to the base of the tear strip 44. Substantial kinetic energy is absorbed by the tear strip 44 as it tears and bends through the propagating living hinge 50.

As an alternative to score lines 46, the linearly propagating stress concentrator may be formed by perforations in the body of the mounting plate 30, or by a shearing type feature where the tear strip 44 is pulled against a rigid supporting structure much like of sheet of paper is torn by pulling downwardly against the edge of a desk. Other stress concentrating mechanisms are of course conceivable. In any event, the integrally formed tear strip 44 provides all of the features and functions of a prior art energy absorption strip but is substantially less expensive to make because it is formed directly in the mounting plate 30. Furthermore, other than establishing the fixed connection 42, no additional assembly steps are required when the steering column assembly 10 is mounted in a motor vehicle.

The tear strip 44 can take any number of forms, shapes or configurations. In FIGS. 1 through 4, a lengthwise slot 48 is formed down the center of the tear strip 44 and serves two functions. Firstly, the slot 48 provides clearance for assembling the fixed connection 42 during the initial installation procedure. Secondly, the slot 48 provides a means for tuning the energy absorption force provided through the tear strip 44, because its width can be used as a means to achieve optimal absorption needs. The narrower the slot 48, the greater the energy absorption force provided by the tear strip 44. This is because a larger cross-section of material will be folded under the mounting plate 30 during a collapse situation. By enlarging the width of the slot 48 between the score lines 46, less material, and therefore a smaller cross-sectional area, is subjected to the "pealing under" operation. Thus, by changing the width of the slot 48, a specific energy absorption force can be established for a given steering column assembly 10.

Figure 6:
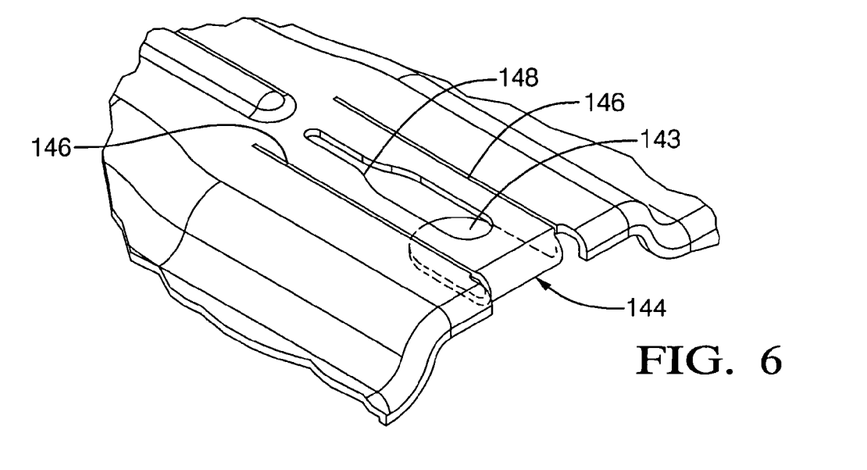
FIG. 6 is a perspective view of a first alternative embodiment of the energy absorbing tear strip.

Referring now the FIG. 6, alternative methods are proposed for turning the energy absorption force along the length of the tear strip 144. In FIG. 6, the slot 148 has been modified to taper from a generally wide opening near the tab 143 and fixed connection 142 to a substantially constricted opening near the base of the tear strip 144. Thus, the transverse cross-sectional area of the tear strip 144 increases along the length of the tear strip 144, which results in an increasing energy absorption force exhibited by the tear strip 144 as the steering column collapses in a frontal collision. The slot 148 could instead be tapered in the other direction to yield a decreasing energy absorption force.

Figure 7:
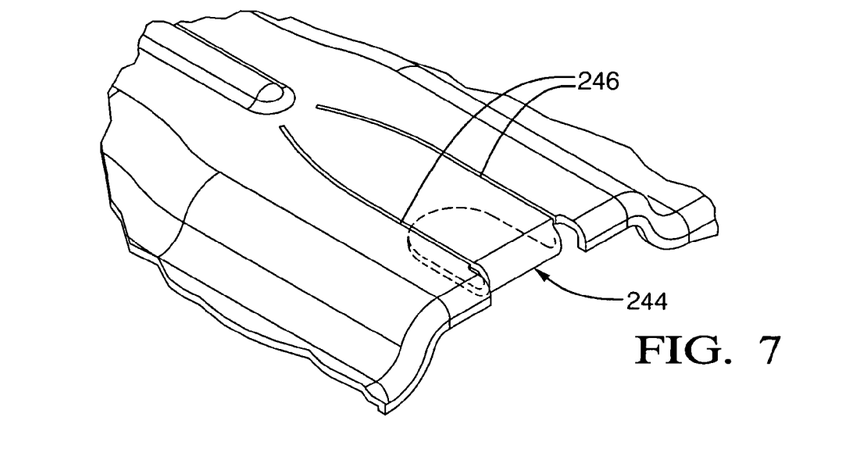
FIG. 7 is a fragmentary perspective view of a second alternative embodiment of the energy absorbing tear strip.

FIG. 7, on the other hand, represents a second alternative embodiment of the tear strip 244 wherein the score lines 246 are not formed parallel to one another as a means of turning its energy absorbing characteristics. The score lines 246 are shown converging toward each other at the base of the tear strip 244. Thus, the transverse cross-sectional area of the tear strip 244, which is measured between score lines 246, decreases along the length of the tear strip 244. As a result, the energy absorption force will decrease with continued travel of the column bracket in a column collapsing situation. Sometimes, design criteria for a particular steering column assembly will dictate this type of varying energy absorption force for a particular application. The score lines 246 could instead be formed as diverging to yield an increasing energy absorption force.

Figure 8:
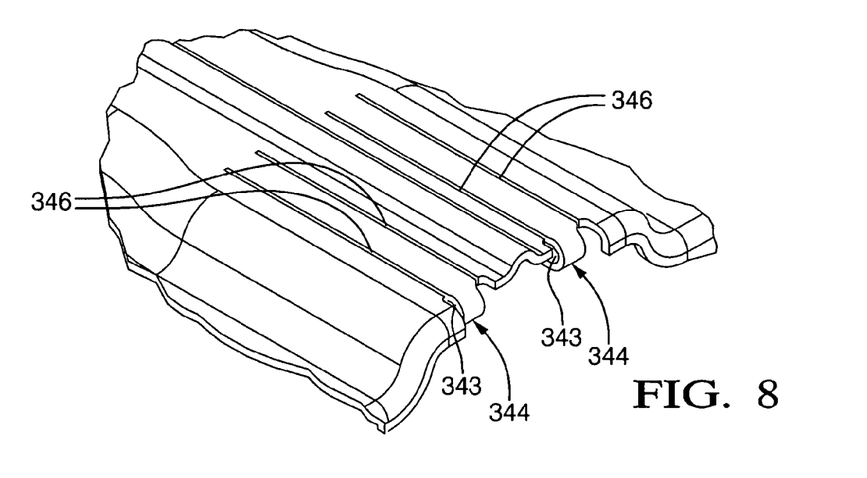
FIG. 8 is a fragmentary perspective view of a third alternative embodiment of the energy absorbing tear strip.

FIG. 8 represents yet a third alternative embodiment of the tear strip 344 design wherein two tear strips 344 are spaced apart one from another in the mounting plate 330. The tear strips 344 can be activated in unison, with a common fixed connection (not shown) simultaneously tearing and bending the respective tear strips 344 during a column collapse situation. Alternatively, the tear strips 344 can be activated independently from one another. For example, a first one of the tear strips 344 may be attached to the column bracket with a fixed connection as described in the preceding examples, whereas a second of the tear strips 344 is selectively disengageable from the column bracket, such as by a solenoid activated or pyrotechnic style device. If the vehicle electronics or sensing equipment determines a need for both tear strips to be activated, the selectively disengageable feature can be deployed.

These are mere examples of the many possible alternatives. The subject tear strip 44 can be configured to achieve a desired or "tuned" energy absorption force by changing the score lines 46, altering the slot 48, changing material thicknesses, or other conceivable means. This can be accomplished inexpensively and without adding unnecessary weight or complexity because the tear strip 44 is formed integrally within the mounting plate 30.

The novel method of this invention can be described as a method of absorbing energy from a collapsing steering column 12 under the influence of an overwhelming force, such as arises during a frontal collision. The method includes the steps of attaching the mounting plate 30 to a vehicle body structure, for example under the dash board. A steering column 12 is supported from the mounting plate 30 through release capsules 24 so that during a collision, the steering column 12 can proceed along a collapse path trajectory. A frangible portion, e.g., the tear strip 44, of the mounting plate 30 is affixed to the steering column 12, such as through a bent under tab 43 via the fixed connection 42. When the steering column 12 is subjected to an overwhelming compressive force, the release capsules 24 automatically disconnect and allow collapsing movement of the steering column 12 relative to the mounting plate 30. According to this invention, the frangible portion of the mounting plate 30 is simultaneously torn and bent to thereby transfer energy from the overwhelming force of the collision into the mounting plate 30 so as to gradually arrest collapsing movement of the steering column 12. This is accomplished without the need for expensive energy absorption straps or spiral devices, and is easy to install and maintain.

The aforementioned step of simultaneously tearing and bending the frangible portion of the mounting plate 30 includes the step of forming a continuously propagating living hinge 50 in the frangible portion of the mounting plate 30. That is, as the tear strip 44 is pealed under, rending the mounting plate 30 along the score lines 46, a living hinge 50 is formed between the leading points of the tear. The combined forces required to tear this frangible portion of the mounting plate 30 away from the remainder of its material, combined with the forces required to bend the tear strip 44 in a reversing direction, equal the energy absorbed from the collapsing steering column 12.

As described above in connection with FIGS. 6 through 8, the step of simultaneously tearing and bending the frangible portion of the mounting plate 30 may including varying the resistive force along the length of the frangible portion. This can be accomplished in a variety of ways, two examples of which comprise varying the width of an included slot 144 and varying the distance between the score lines 244. Other arrangements are of course possible.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An energy absorbing column mounting assembly for a collapsible steering column, said mounting assembly comprising:
   a mounting plate for rigid attachment to a vehicle body structure;
   a column bracket adjacent said mounting plate for supporting a vehicular steering column;
   at least one releasable connection interconnecting said column bracket to said mounting plate for automatically disconnecting said column bracket in response to a predetermined disconnection force during a controlled collapse of the steering column;
   at least one fixed connection joining said column bracket to said mounting plate for maintaining a connection therebetween after said releasable connection has yielded to the disconnection force; and
   an energy absorbing tear strip formed integrally in said mounting plate adjacent said fixed connection for deforming a portion of said mounting plate under the influence of an overwhelming force applied through said fixed connection to gradually arrest relative movement between said column bracket and said mounting plate during a controlled collapse of the steering column.

2. The assembly of claim 1 wherein said tear strip includes at least one linearly propagating stress concentrator formed in said mounting plate.

3. The assembly of claim 2 wherein said linearly propagating stress concentrator comprises a generally continuous score line of reduced cross-sectional thickness in said mounting plate.

4. The assembly of claim 1 wherein said mounting plate includes a guide for influencing the travel path of said column bracket during collapse of the steering column.

5. The assembly of claim 1 wherein said mounting plate includes at least three spaced apart mounting points for attachment to the vehicle body structure.

6. The assembly of claim 1 wherein said tear strip has a length and a transverse cross-sectional area which varies along said length.

7. The assembly of claim 1 wherein said mounting plate includes a second tear strip generally parallel to the first said tear strip.

8. The assembly of claim 1 wherein said column bracket includes an adjustment mechanism for changing the orientation of said steering column relative to said column bracket.

9. A collapsible steering column assembly for a motor vehicle, said assembly comprising:
   a mounting plate for rigid attachment to a vehicle body structure;
   a column bracket disposed below said mounting plate;
   a vehicular steering column carried in said column bracket;
   at least one releasable connection interconnecting said column bracket to said mounting plate for automatically disconnecting said column bracket in response to a predetermined disconnection force during a controlled collapse of said steering column;
   at least one fixed connection joining said column bracket to said mounting plate for maintaining a connection after said releasable connection has yielded to the disconnection force; and
   an energy absorbing tear strip formed integrally in said mounting plate adjacent said fixed connection for deforming a frangible portion of said mounting plate under the influence of an overwhelming force applied thereto through said fixed connection to gradually arrest relative movement between said column bracket and said mounting plate during a controlled collapse of said steering column.

10. The assembly of claim 9 wherein said tear strip includes at least one linearly propagating stress concentrator formed in said mounting plate.

11. The assembly of claim 10 wherein said linearly propagating stress concentrator comprises a generally continuous score line of reduced cross-sectional thickness in said mounting plate.

12. The assembly of claim 9 wherein said mounting plate includes a guide for influencing the travel path of said column bracket during collapse of the steering column.

13. The assembly of claim 9 wherein said mounting plate includes at least three spaced apart mounting points for attachment to the vehicle body structure.

14. The assembly of claim 9 wherein said tear strip has a length and a transverse cross-sectional area which varies along said length.

15. A method of absorbing energy from a collapsing steering column under the influence of an overwhelming force, said method comprising the steps of:
   attaching a mounting plate to a vehicle body structure;
   supporting a steering column from the mounting plate through a releasable connection;
   affixing a frangible portion of the mounting plate to the steering column;
   subjecting the steering column to an overwhelming compressive force;

automatically disconnecting the releasable connection to allow collapsing movement of the steering column relative to the mounting plate; and simultaneously tearing and bending the frangible portion of the mounting plate and thereby transferring energy from the overwhelming force into the mounting plate to gradually arrest collapsing movement of the steering column.

16. The method as set forth in claim 15 wherein said step of simultaneously tearing and bending includes forming a continuously propagating living hinge in the frangible portion of the mounting plate.

17. The method as set forth in claim 15 wherein said step of simultaneously tearing and bending includes varying the resistive force along the length of the frangible portion.

18. The method as set forth in claim 15 wherein said step of attaching a mounting plate includes spacing the connection between at least three mounting points.

19. The method as set forth in claim 15 further including altering the travel path of the steering column during collapse.

* * * * *